(12) United States Patent
Bajpai et al.

(10) Patent No.: US 10,751,639 B2
(45) Date of Patent: Aug. 25, 2020

(54) PROCESS AND APPARATUS FOR HYDROCRACKING WITH INTEGRATED DUAL STRIPPING COLUMNS

(71) Applicant: UOP LLC, Des Plaines, IL (US)

(72) Inventors: Hari S. Bajpai, Haryana (IN); Donald A. Eizenga, Elk Grove Village, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/018,389

(22) Filed: Jun. 26, 2018

(65) Prior Publication Data

US 2019/0388798 A1    Dec. 26, 2019

(51) Int. Cl.
| | | |
|---|---|---|
| *B01D 3/00* | (2006.01) | |
| *B01D 3/26* | (2006.01) | |
| *B01D 3/32* | (2006.01) | |
| *C10G 65/12* | (2006.01) | |

(52) U.S. Cl.
CPC ............ *B01D 3/322* (2013.01); *B01D 3/009* (2013.01); *B01D 3/26* (2013.01); *C10G 65/12* (2013.01); *C10G 2300/202* (2013.01); *C10G 2400/04* (2013.01)

(58) Field of Classification Search
CPC . B01D 3/00; B01D 3/009; B01D 3/14; B01D 3/26; B01D 3/32; B01D 3/322; C10G 65/00; C10G 65/02; C10G 65/12; C10G 2300/20–202; C10G 2400/04
See application file for complete search history.

(56) References Cited

U.S. PATENT DOCUMENTS

| | | | |
|---|---|---|---|
| 3,690,816 A | * | 9/1972 | Alleman ............... C01B 17/167 208/236 |
| 6,432,297 B1 | | 8/2002 | Kalnes |
| 9,127,209 B2 | * | 9/2015 | Van Wees ............... C10G 7/00 |
| 9,593,888 B2 | | 3/2017 | Noureldin et al. |
| 2017/0362516 A1 | * | 12/2017 | Wang .................... C10G 65/12 |

FOREIGN PATENT DOCUMENTS

WO    2018005178 A1    1/2018

* cited by examiner

*Primary Examiner* — Natasha E Young
(74) *Attorney, Agent, or Firm* — Paschall & Associates, LLC; James C. Paschall

(57) ABSTRACT

A process and apparatus for hydrocracking a hydrocarbon stream and with heat integration between two stripping columns. Both stripping columns use a reboiler for heat input to avoid steam recovery and dew point issues in the overhead. A hot stripped stream can provide heat to the cold stripping column by heat exchange. Additionally, as few as two heaters that rely on external utilities may be required for reboiling fractionator column bottoms.

17 Claims, 2 Drawing Sheets

PROCESS AND APPARATUS FOR HYDROCRACKING WITH INTEGRATED DUAL STRIPPING COLUMNS

FIELD

The field is the recovery of hydrocracked hydrocarbon streams with improved efficiency.

BACKGROUND

Hydroprocessing can include processes which convert hydrocarbons in the presence of hydroprocessing catalyst and hydrogen to more valuable products. Hydrocracking is a hydroprocessing process in which hydrocarbons crack in the presence of hydrogen and hydrocracking catalyst to lower molecular weight hydrocarbons. Depending on the desired output, a hydrocracking unit may contain one or more beds of the same or different catalyst. Hydrocracking can be performed with one or two hydrocracking reactor stages.

A hydroprocessing recovery section typically includes a series of separators in a separation section to separate gases from liquid materials and cool and depressurize liquid streams to prepare them for fractionation into products. Hydrogen gas is recovered for recycle to the hydroprocessing unit. A typical hydrocracking recovery section comprises six columns. A stripping column strips hydrogen sulfide off of a liquid hydrocracked stream with a steam stream. A liquid stripping stream is fractionated in a deethanizer column whose overhead is sponged along with a vapor stripping overhead stream in an absorber column to product LPG. A product fractionation column separates the stripped liquid hydrocracked stream into an overhead fractionated stream comprising naphtha, perhaps a distillate side product stream and a bottoms stream comprising unconverted oil comprising distillate. The product fractionation overhead stream and the deethanizer column bottoms stream are fractionated in a debutanizer fractionation column into a debutanizer overhead stream comprising LPG and a debutanized bottoms stream comprising naphtha. The debutanized bottoms stream is fractionated in a naphtha splitter column into a light naphtha overhead stream and a heavy naphtha bottom stream.

Hydroprocessing recovery sections comprising fractionation columns rely on external utilities that originate from outside of the hydroprocessing unit to provide heater duty to vaporize the fractionation materials. Fractionation sections that rely more on heat generated in the hydroprocessing unit than external utilities are more energy efficient. Stripping columns typically rely on steam stripping to separate volatile materials from heavier hydrocarbon materials.

In some regions, diesel demand is lower than demand for lighter fuel products. Distillate or diesel hydrocracking is proposed for producing the lighter fuel products such as naphtha and liquefied petroleum gas (LPG). The naphtha product stream may be proposed for a petrochemical production and taken as feed to a reformer unit followed by an aromatics complex.

There is a continuing need, therefore, for improving the efficiency of processes for recovering petrochemical feedstock from hydrocracked distillate stocks.

BRIEF SUMMARY

We have discovered a process and apparatus for hydrocracking a hydrocarbon stream that integrates reboil heating of a cold stripping column and a hot stripping column. Reboiling can be used to provide heat to the stripping columns because sufficient distillate and lighter naphtha products are in the hydrocracked product. Moreover, one furnace may be sufficient to provide reboil needs for both stripping columns.

DEFINITIONS

Figure 1:
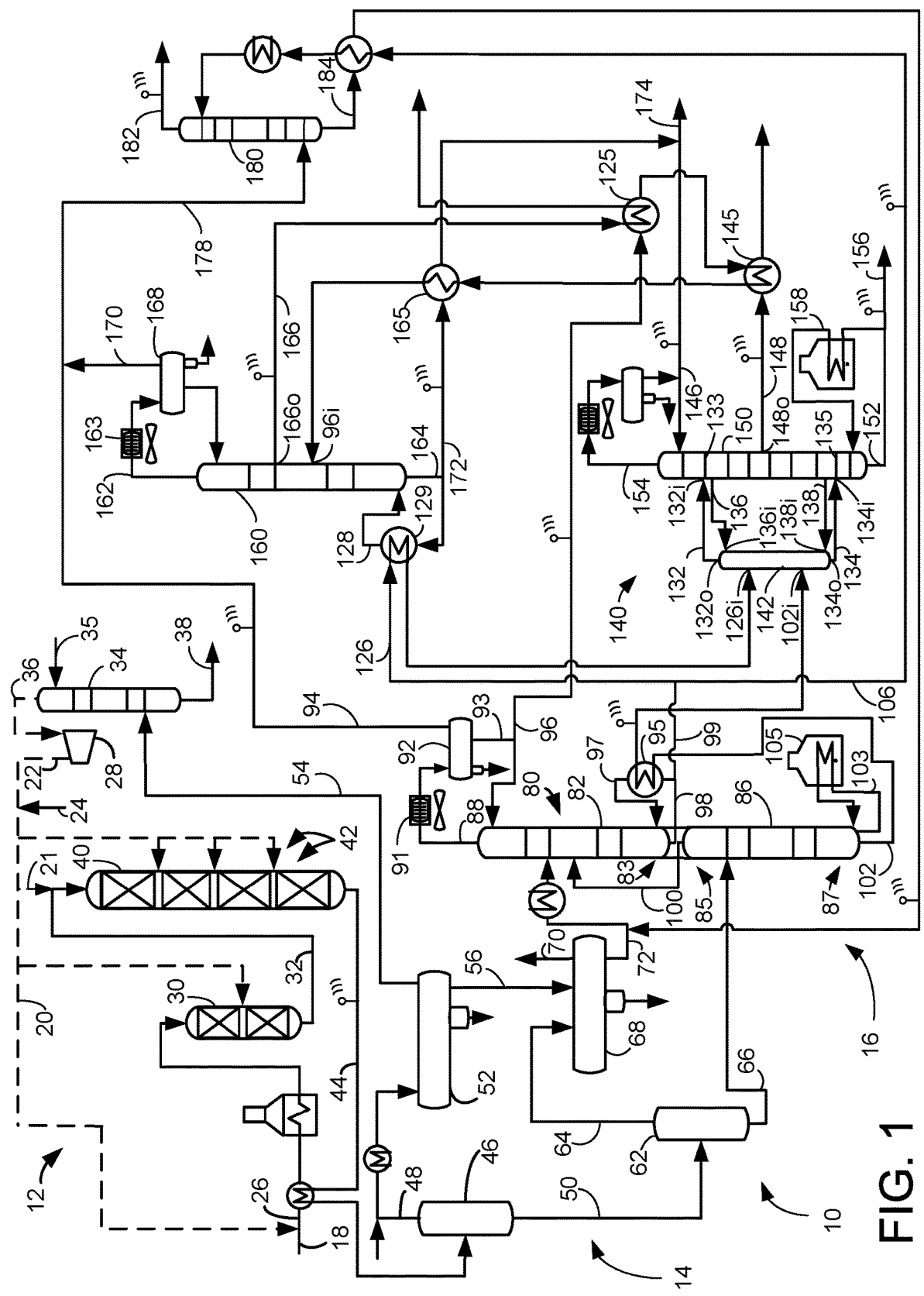
FIG. 1 is a simplified process flow diagram.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a conversion unit to undergo a compositional change due to physical or chemical conversion.

The term "indirect communication" means that flow from the upstream component enters the downstream component after passing through a separation or conversion unit to undergo a compositional change due to physical separation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripping columns typically feed a top tray and take stripped product from the bottom.

As used herein, the term "T5" or "T95" means the temperature at which 5 liquid volume percent or 95 liquid volume percent, as the case may be, respectively, of the sample boils using ASTM D-86 or TBP.

As used herein, the term "external utilities" means utilities that originate from outside of the hydroprocessing unit to typically provide heater duty to vaporize fractionation materials. External utilities may provide heater duty through fired heaters, steam heat exchangers and hot oil heaters.

As used herein, the term "initial boiling point" (IBP) means the temperature at which the sample begins to boil using ASTM D-86 or TBP.

As used herein, the term "end point" (EP) means the temperature at which the sample has all boiled off using ASTM D-86 or TBP.

As used herein, the term "True Boiling Point" (TBP) means a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "naphtha boiling range" means hydrocarbons boiling in the range of an IBP between about 0° C. (32° F.) and about 100° C. (212° F.) or a T5 between about 15° C. (59° F.) and about 100° C. (212° F.) and the "naphtha cut point" comprising a T95 between about 150° C. (302° F.) and about 200° C. (392° F.) using the TBP distillation method.

As used herein, the term "kerosene boiling range" means hydrocarbons boiling in the range of an IBP between about 125° C. (257° F.) and about 175° C. (347° F.) and the "kerosene cut point" comprising and an end point between about 215° C. (419° F.) and about 260° C. (500° F.) using the TBP distillation method.

As used herein, the term "diesel boiling range" means hydrocarbons boiling in the range of an IBP between about 125° C. (257° F.) and about 260° C. (500° F.) and preferably no more than about 175° C. (347° F.) or a T5 between about 150° C. (302° F.) and about 260° C. (500° F.) and preferably no more than about 200° C. (392° F.) and the "diesel cut point" comprising a T95 between about 343° C. (650° F.) and about 399° C. (750° F.) using the TBP distillation method.

As used herein, the term "conversion" means conversion of feed to material that boils below the relevant cut point.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, the term "$C_x$" is to be understood to refer to molecules having the number of carbon atoms represented by the subscript "x". Similarly, the term "$C_x-$" refers to molecules that contain less than or equal to x and preferably x and less carbon atoms. The term "$C_x+$" refers to molecules with more than or equal to x and preferably x and more carbon atoms.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

DETAILED DESCRIPTION

A proposed process and apparatus for recovering products from hydrocracked distillate comprise a cold stripping column and a hot stripping column, a debutanizer column, a product fractionation column and a sponge absorber column. The cold stripping column and the hot stripping column may have integrated reboilers. The cold stripped stream and the hot stripped stream are fed to a product fractionation column that includes a prefractionator from which a prefractionated overhead stream and a prefractionated bottoms stream are passed to a product fractionation column. The product fractionation column produces three products, an overhead product stream comprising light naphtha (LN), an intermediate product stream comprising heavy naphtha (HN) and bottoms unconverted oil (UCO) stream omitting the need for a separate naphtha splitter column. The cold stripping column or the hot stripping column may provide a liquid stripping overhead stream and a stripped stream. The liquid stripping overhead stream may be fractionated to provide a light fractionated overhead stream, a light fractionated intermediate stream and a light fractionated bottoms stream in a single light fractionation column omitting the need for a separate deethanizer column. The deethanizer column and the naphtha splitter column are not required to meet the desired specification for downstream units thereby saving capital and operation expenses. The cold stripping column or the hot stripping column may also provide a vapor stripping overhead stream from which LPG hydrocarbons may be absorbed by an absorbent from the stripped stream.

In FIG. 1, a hydroprocessing unit 10 for hydroprocessing hydrocarbons comprises a hydroprocessing reactor section 12, a separation section 14 and a recovery section 16. The hydroprocessing unit 10 may be designed for hydrocracking heavier hydrocarbons into distillate such as kerosene, naphtha and LPG products. For example, a diesel stream in hydrocarbon line 18 and a hydrogen stream in hydrogen line 20 are fed to the hydroprocessing reactor section 12. In an aspect, a vacuum gas oil stream may be a heavier hydrocarbon in the hydrocarbon line 18. Hydroprocessed effluent is separated in the separation section 14 and fractionated into products in the recovery section 16.

Hydroprocessing that occurs in the hydroprocessing reactor section 12 may be hydrocracking optionally preceded by hydrotreating. Hydrocracking is the preferred process in the hydroprocessing reactor section 12. Consequently, the term "hydroprocessing" will include the term "hydrocracking" herein.

In one aspect, the process and apparatus described herein are particularly useful for hydrocracking a hydrocarbon feed stream comprising a distillate. A suitable distillate may include a diesel feed boiling in the range of an IBP between about 125° C. (257° F.) and about 175° C. (347° F.), a T5 between about 150° C. (302° F.) and about 200° C. (392° F.) and/or a "diesel cut point" comprising a T95 between about 343° C. (650° F.) and about 399° C. (750° F.) using the TBP distillation method. Other feed streams may also be suitable including a vacuum gas oil (VGO), which is typically a hydrocarbon material having a boiling range with an IBP of at least about 232° C. (450° F.), a T5 of about 288° C. (550° F.) to about 343° C. (650° F.), a T95 between about 510° C. (950° F.) and about 570° C. (1058° F.) and/or an EP of no more than about 626° C. (1158° F.) prepared by vacuum fractionation of atmospheric residue.

The hydrogen stream in the hydrogen line 20 may split off from a hydroprocessing hydrogen line 22. The hydrogen stream in line 20 may be a hydrotreating hydrogen stream. The hydrotreating hydrogen stream may join the hydrocarbon stream in the hydrocarbon line 18 to provide a hydrocarbon feed stream in a hydrocarbon feed line 26. The hydrocarbon feed stream in the hydrocarbon feed line 26 may be heated by heat exchange with a hydrocracked stream in a hydrocracked effluent line 44 and in a fired heater. A heated hydrocarbon feed stream in the hydrocarbon feed line 26 may be fed to an optional hydrotreating reactor 30.

Hydrotreating is a process wherein hydrogen is contacted with hydrocarbon in the presence of hydrotreating catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Consequently, the term "hydroprocessing" may include the term "hydrotreating" herein.

The hydrotreating reactor 30 may be a fixed bed reactor that comprises one or more vessels, single or multiple beds of catalyst in each vessel, and various combinations of hydrotreating catalyst in one or more vessels. It is contemplated that the hydrotreating reactor 30 be operated in a continuous liquid phase in which the volume of the liquid hydrocarbon feed is greater than the volume of the hydrogen gas. The hydrotreating reactor 30 may also be operated in a conventional continuous gas phase, a moving bed or a fluidized bed hydrotreating reactor. The hydrotreating reactor 30 may provide conversion per pass of about 10 to about 30 vol %.

The hydrotreating reactor 30 may comprise a guard bed of specialized material for pressure drop mitigation followed by one or more beds of higher quality hydrotreating catalyst. The guard bed filters particulates and picks up contaminants in the hydrocarbon feed stream such as metals like nickel, vanadium, silicon and arsenic which deactivate the catalyst. The guard bed may comprise material similar to the hydrotreating catalyst. Supplemental hydrogen may be added at an interstage location between catalyst beds in the hydrotreating reactor 30.

Suitable hydrotreating catalysts are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present description that more than one type of hydrotreating catalyst be used in the same hydrotreating reactor 30. The Group VIII metal is typically present in an amount ranging from about 2 to about 20 wt %, preferably from about 4 to about 12 wt %. The Group VI metal will typically be present in an amount ranging from about 1 to about 25 wt %, preferably from about 2 to about 25 wt %.

Preferred hydrotreating reaction conditions include a temperature from about 290° C. (550° F.) to about 455° C. (850° F.), suitably 316° C. (600° F.) to about 427° C. (800° F.) and preferably 343° C. (650° F.) to about 399° C. (750° F.), a pressure from about 2.8 MPa (gauge) (400 psig) to about 17.5 MPa (gauge) (2500 psig), a liquid hourly space velocity of the fresh hydrocarbonaceous feedstock from about 0.1 $hr^{-1}$, suitably 0.5 $hr^{-1}$, to about 5 $hr^{-1}$, preferably from about 1.5 to about 4 $hr^{-1}$, and a hydrogen rate of about 84 $Nm^3/m^3$ (500 scf/bbl), to about 1,250 $Nm^3/m^3$ oil (7,500 scf/bbl), preferably about 168 $Nm^3/m^3$ oil (1,000 scf/bbl) to about 1,011 $Nm^3/m^3$ oil (6,000 scf/bbl), with a hydrotreating catalyst or a combination of hydrotreating catalysts.

The hydrocarbon feed stream in the hydrocarbon feed line 18 may be hydrotreated with the hydrotreating hydrogen stream from hydrotreating hydrogen line 20 over the hydrotreating catalyst in the hydrotreating reactor 30 to provide a hydrotreated stream that exits the hydrotreating reactor 30 in a hydrotreated effluent line 32. The hydrotreated stream still predominantly boils in the boiling range of the feed stream and may be taken as a hydrocracking feed stream. The hydrogen gas laden with ammonia and hydrogen sulfide may be removed from the hydrocracking feed stream in a separator, but the hydrocracking feed stream is suitably fed directly to the hydrocracking reactor 40 without separation. The hydrocracking feed stream may be mixed with a hydrocracking hydrogen stream in a hydrocracking hydrogen line 21 taken from the hydroprocessing hydrogen line 22 and be fed through an inlet to the hydrocracking reactor 40 to be hydrocracked.

Hydrocracking is a process in which hydrocarbons crack in the presence of hydrogen to lower molecular weight hydrocarbons. The hydrocracking reactor 40 may be a fixed bed reactor that comprises one or more vessels, single or multiple catalyst beds 42 in each vessel, and various combinations of hydrotreating catalyst and/or hydrocracking catalyst in one or more vessels. It is contemplated that the hydrocracking reactor 40 be operated in a continuous liquid phase in which the volume of the liquid hydrocarbon feed is greater than the volume of the hydrogen gas. The hydrocracking reactor 40 may also be operated in a conventional continuous gas phase, a moving bed or a fluidized bed hydrocracking reactor.

The hydrocracking reactor 40 comprises a plurality of hydrocracking catalyst beds 42. If the hydrocracking reactor section 12 does not include a hydrotreating reactor 30, the catalyst beds 42 in the hydrocracking reactor 40 may include hydrotreating catalyst for the purpose of saturating, demetallizing, desulfurizing or denitrogenating the hydrocarbon feed stream before it is hydrocracked with the hydrocracking catalyst in subsequent vessels or catalyst beds 42 in the hydrocracking reactor 40.

The hydrotreated feed stream is hydrocracked over a hydrocracking catalyst in the hydrocracking reactor 40 in the presence of the hydrocracking hydrogen stream from the hydrocracking hydrogen line 21 to provide a hydrocracked stream. A hydrogen manifold may deliver supplemental hydrogen streams to one, some or each of the catalyst beds 42. In an aspect, the supplemental hydrogen is added to each of the hydrocracking catalyst beds 42 at an interstage location between adjacent beds, so supplemental hydrogen is mixed with hydroprocessed effluent exiting from the upstream catalyst bed 42 before entering the downstream catalyst bed 42.

The hydrocracking reactor may provide a total conversion of at least about 20 vol % and typically greater than about 60 vol % of the hydrotreated hydrocarbon stream in the hydrocracking feed line 32 to products boiling below the cut point of the heaviest desired product which is typically diesel or naphtha. The hydrocracking reactor 40 may operate at partial conversion of more than about 30 vol % or full conversion of at least about 90 vol % of the feed based on total conversion. The hydrocracking reactor 40 may be operated at mild hydrocracking conditions which will provide about 20 to about 60 vol %, preferably about 20 to about 50 vol %, total conversion of the hydrocarbon feed stream to product boiling below the desired cut point.

The hydrocracking catalyst may utilize amorphous silica-alumina bases or zeolite bases upon which is deposited a Group VIII metal hydrogenating component. Additional metal hydrogenating components may be selected from Group VIB for incorporation with the base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms. It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8 and 12 Angstroms, wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006.

Mixed polyvalent metal-hydrogen zeolites may be prepared by ion-exchanging with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 wt %, and preferably at least about 20 wt %, metal-cation-deficient, based on the initial ion-exchange capacity. In another aspect, a desirable and stable class of zeolites is one wherein at least about 20 wt % of the ion exchange capacity is satisfied by hydrogen ions.

The active metals employed in the preferred hydrocracking catalysts of the present invention as hydrogenation components are those of Group VIII; i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 wt % and about 30 wt % may be used. In the case of the noble metals, it is normally preferred to use about 0.05 to about 2 wt % noble metal.

The method for incorporating the hydrogenation metal is to contact the base material with an aqueous solution of a suitable compound of the desired metal wherein the metal is present in a cationic form. Following addition of the selected hydrogenation metal or metals, the resulting catalyst powder is then filtered, dried, pelleted with added lubricants, binders or the like if desired, and calcined in air at temperatures of; e.g., about 371° C. (700° F.) to about 648° C. (1200° F.) in order to activate the catalyst and decompose ammonium ions. Alternatively, the base component may be pelleted, followed by the addition of the hydrogenation component and activation by calcining.

The foregoing catalysts may be employed in undiluted form, or the powdered catalyst may be mixed and co-pelleted with other relatively less active catalysts, diluents or binders such as alumina, silica gel, silica-alumina co-gels, activated clays and the like in proportions ranging between about 5 and about 90 wt %. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,178.

By one approach, the hydrocracking conditions may include a temperature from about 290° C. (550° F.) to about 468° C. (875° F.), preferably 343° C. (650° F.) to about 445° C. (833° F.), a pressure from about 4.8 MPa (gauge) (700 psig) to about 20.7 MPa (gauge) (3000 psig), a liquid hourly space velocity (LHSV) from about 0.4 to about 2.5 $hr^{-1}$ and a hydrogen rate of about 421 $Nm^3/m^3$ (2,500 scf/bbl) to about 2,527 $Nm^3/m^3$ oil (15,000 scf/bbl). If mild hydrocracking is desired, conditions may include a temperature from about 315° C. (600° F.) to about 441° C. (825° F.), a pressure from about 5.5 MPa (gauge) (800 psig) to about 13.8 MPa (gauge) (2000 psig) or more typically about 6.9 MPa (gauge) (1000 psig) to about 11.0 MPa (gauge) (1600 psig), a liquid hourly space velocity (LHSV) from about 0.5 to about 2 $hr^{-1}$ and preferably about 0.7 to about 1.5 $hr^{-1}$ and a hydrogen rate of about 421 $Nm^3/m^3$ oil (2,500 scf/bbl) to about 1,685 $Nm^3/m^3$ oil (10,000 scf/bbl).

The hydrocracked stream may exit the hydrocracking reactor 40 in the hydrocracked line 44 and be separated in the separation section 14 in downstream communication with the hydrocracking reactor 40 and optionally the hydrotreating reactor 30. The separation section 14 comprises one or more separators in downstream communication with the hydroprocessing reactor comprising the hydrotreating reactor 30 and/or the hydrocracking reactor 40. The hydrocracked stream in the hydrocracked line 44 may in an aspect be heat exchanged with the hydrocarbon feed stream in the hydrocarbon feed line 26 to be cooled before entering a hot separator 46.

The hot separator separates the hydrocracked stream in the hydrocracked line 44 to provide a hydrocarbonaceous, hot vaporous hydrocracked stream in a hot overhead line 48 and a hydrocarbonaceous, hot liquid hydrocracked stream in a hot bottoms line 50. The hot separator 46 may be in downstream communication with the hydrocracking reactor 40. The hot separator 46 operates at about 150° C. (300° F.) to about 371° C. (700° F.) and preferably operates at about 175° C. (350° F.) to about 260° C. (500° F.). The hot separator 46 may be operated at a slightly lower pressure than the hydrocracking reactor 40 accounting for pressure drop through intervening equipment. The hot separator may be operated at pressures between about 3.4 MPa (gauge) (493 psig) and about 20.4 MPa (gauge) (2959 psig). The hydrocarbonaceous, hot gaseous hydrocracked stream in the hot overhead line 48 may have a temperature of the operating temperature of the hot separator 46.

The hot vaporous hydrocracked stream in the hot overhead line 48 may be cooled before entering a cold separator 52. As a consequence of the reactions taking place in the hydrocracking reactor 40 wherein nitrogen, chlorine and sulfur are removed from the feed, ammonia and hydrogen sulfide are formed. At a characteristic sublimation temperature, ammonia and hydrogen sulfide will combine to form ammonium bisulfide and ammonia, and chlorine will combine to form ammonium chloride. Each compound has a characteristic sublimation temperature that may allow the compound to coat equipment, particularly heat exchange equipment, impairing its performance. To prevent such deposition of ammonium bisulfide or ammonium chloride salts in the hot overhead line 48 transporting the hot vaporous hydrocracked stream, a suitable amount of wash water may be introduced into the hot overhead line 48 upstream of a cooler at a point in the hot overhead line 48 where the temperature is above the characteristic sublimation temperature of either compound.

The hot vaporous hydrocracked stream may be separated in the cold separator 52 to provide a cold vaporous hydrocracked stream comprising a hydrogen-rich gas stream in a cold overhead line 54 and a cold liquid hydrocracked stream in a cold bottoms line 56. The cold separator 52 serves to separate hydrogen rich gas from hydrocarbon liquid in the hydrocracked stream for recycle to the hydrocracking reactor 40 in the cold overhead line 54. The cold separator 52, therefore, is in downstream communication with the hot overhead line 48 of the hot separator 46 and the hydrocracking reactor 40. The cold separator 52 may be operated at about 100° F. (38° C.) to about 150° F. (66° C.), suitably about 115° F. (46° C.) to about 145° F. (63° C.), and just below the pressure of the hydrocracking reactor 40 and the hot separator 46 accounting for pressure drop through intervening equipment to keep hydrogen and light gases in the overhead and normally liquid hydrocarbons in the bottoms. The cold separator 52 may be operated at pressures between about 3 MPa (gauge) (435 psig) and about 20 MPa (gauge) (2,901 psig). The cold separator 52 may also have a boot for collecting an aqueous phase. The cold hydrocracked stream in the cold bottoms line 56 may have a temperature of the operating temperature of the cold separator 52.

The cold vaporous hydrocracked stream in the cold overhead line 54 is rich in hydrogen. Thus, hydrogen can be recovered from the cold gaseous stream. The cold gaseous stream in the cold overhead line 54 may be passed through a trayed or packed recycle absorption column 34 where it is scrubbed by means of an absorbent liquid such as an aqueous solution fed by line 35 to remove acid gases including hydrogen sulfide and carbon dioxide by absorbing them into the aqueous solution. Preferred aqueous solutions include lean amines such as alkanolamines, diethanolamine, monoethanolamine, and methyldiethanolamine. Other amines can be used in place of or in addition to the preferred amines. The lean amine contacts the cold vaporous stream and absorbs acid gas contaminants such as hydrogen sulfide and carbon dioxide. The resultant "sweetened" cold vaporous hydrocracked stream is taken out from an overhead outlet of the recycle absorption column 34 in a recycle absorption overhead line 36, and a rich amine is taken out from the bottoms at a bottom outlet of the recycle absorption column in a recycle absorption bottoms line 38. The spent absorbent liquid from the bottoms may be regenerated and recycled back (not shown) to the recycle absorption column 34 in line 35.

The absorbed hydrogen-rich stream emerges from the absorption column 34 via the recycle absorption overhead line 36 and may be compressed in a recycle compressor 28 to provide a recycle hydrogen stream in line 22. The recycle hydrogen stream in line 22 may be supplemented with a make-up hydrogen stream in the make-up line 24 to provide the hydrogen stream in hydrogen line 20. A portion of the recycle hydrogen stream in line 22 may be routed to the intermediate catalyst bed outlets in the hydrotreating reactor 30 and the hydrocracking reactor 40 to control the inlet temperature of the subsequent catalyst bed (not shown). The recycle absorption column 34 may be operated with a gas inlet temperature between about 38° C. (100° F.) and about 66° C. (150° F.) and an overhead pressure of about 3 MPa (gauge) (435 psig) to about 20 MPa (gauge) (2900 psig).

The hydrocarbonaceous hot liquid hydrocracked stream in the hot bottoms line 50 may be taken as a hot liquid hydrocracked stream and stripped as a hot hydrocracked liquid stream in the recovery section 16. In an aspect, the hot liquid hydrocracked stream in the hot bottoms line 50 may be let down in pressure and flashed in a hot flash drum 62 to provide a flash hot vaporous hydrocracked stream of light ends in a hot flash overhead line 64 and a flash hot liquid hydrocracked stream in a hot flash bottoms line 66. The hot flash drum 62 may be any separator that splits the hot liquid hydrocracked stream into vapor and liquid fractions. The hot flash drum 62 may be in direct, downstream communication with the hot bottoms line 50 and in downstream communication with the hydrocracking reactor 40. The hot flash drum 62 may be operated at the same temperature as the hot separator 46 but at a lower pressure of between about 1.4 MPa (gauge) (200 psig) and about 6.9 MPa (gauge) (1000 psig), suitably no more than about 3.8 MPa (gauge) (550 psig). The flash hot liquid hydrocracked stream in the hot flash bottoms line 56 may be fractionated in the recovery section 16. The flash hot liquid hydrocracked stream in the hot flash bottoms line 66 may have a temperature of the operating temperature of the hot flash drum 62.

In an aspect, the cold liquid hydrocracked stream in the cold bottoms line 56 may be taken as a cold liquid hydrocracked stream and fractionated in the recovery section 16. In a further aspect, the cold liquid hydrocracked stream may be let down in pressure and flashed in a cold flash drum 68 to separate the cold liquid hydrocracked stream in the cold bottoms line 56.

The cold flash drum 68 may be any separator that splits hydrocracked stream into vapor and liquid fractions. The cold flash drum 68 may also have a boot for collecting an aqueous phase. The cold flash drum 68 may be in direct, downstream communication with the cold bottoms line 56 of the cold separator 52 and in downstream communication with the hydrocracking reactor 40.

In a further aspect, the flash hot hydrocracked stream in the hot flash overhead line 64 may be fractionated as a hydrocracked stream in the recovery section 16. In a further aspect, the flash hot vaporous hydrocracked stream may be cooled and also separated in the cold flash drum 68. The cold flash drum 68 may separate the cold liquid hydrocracked stream in the cold bottoms line 56 and/or the flash hot vaporous hydrocracked stream in the hot flash overhead line 64 to provide a flash cold vaporous hydrocracked stream in a cold flash overhead line 70 and a flash cold liquid hydrocracked stream in a cold flash bottoms line 72. In an aspect, light gases such as hydrogen sulfide are stripped from the flash cold liquid hydrocracked stream. Accordingly, a stripping column 80 may be in downstream communication with the cold flash drum 68 and the cold flash bottoms line 72. The cold flash drum 68 may be in downstream communication with the cold bottoms line 56 of the cold separator 52, the hot flash overhead line 64 of the hot flash drum 62 and the hydrocracking reactor 40. The cold liquid hydrocracked stream in cold bottoms line 56 and the flash hot vaporous stream in the hot flash overhead line 64 may enter into the cold flash drum 68 either together or separately. The cold flash drum 68 may be operated at the same temperature as the cold separator 52 but typically at a lower pressure of between about 1.4 MPa (gauge) (200 psig) and about 6.9 MPa (gauge) (1000 psig) and preferably between about 3.0 MPa (gauge) (435 psig) and about 3.8 MPa (gauge) (550 psig). A flashed aqueous stream may be removed from a boot in the cold flash drum 68. The flash cold liquid hydrocracked stream in the cold flash bottoms line 72 may have the same temperature as the operating temperature of the cold flash drum 68. The flash cold vaporous hydrocracked stream in the cold flash overhead line 70 may contain substantial hydrogen that may be further recovered.

The recovery section 16 may include the stripping column 80, a product fractionation column 140, a light fractionation column 160 and a sponge absorber column 180. The stripping column 80 may be in downstream communication with a bottoms line in the separation section 14 for stripping volatiles from the hydrocracked streams. For example, the stripping column 80 may be in downstream communication with the hot bottoms line 50, the hot flash bottoms line 66, the cold bottoms line 56 and/or the cold flash bottoms line 72. In an aspect, the stripping column 80 may be a vessel that contains a cold stripping column 82 and a hot stripping column 86 with at least one wall that isolates each of the stripping columns 82, 86 from the other. The cold stripping column 82 may be in downstream communication with the hydrocracking reactor 40, the cold bottoms line 56 and, in an aspect, the cold flash bottoms line 72 for stripping the cold hydrocracked liquid stream which may be the flash cold hydrocracked liquid stream. The cold stripping column 82 may be in downstream communication with the hot overhead line 48 and the hot flash overhead line 64. The hot stripping column 86 may be in downstream communication with the hydrocracking reactor 40, the hot bottoms line 50 and, in an aspect, the hot flash bottoms line 72 for stripping the hot liquid hydrocracked stream which is hotter than the cold liquid hydrocracked stream by at least 25° C. and preferably at least 50° C. In an aspect, the cold liquid hydrocracked stream may be the flash cold liquid hydrocracked stream in the cold flash bottoms line 72.

The stripping columns 82 and 86 operate at high pressure to maintain $C_{5+}$ and $C_{6+}$ hydrocarbons in the stripped streams, respectively, and stripping the predominance of $C_{4-}$ and hydrogen sulfide and other acid gases into the overhead. The flash cold liquid hydrocracked stream in the cold flash bottoms line 72 may be taken as a cold liquid hydrocracked stream, optionally heated, mixed with a LPG rich absorbent stream in an absorber bottoms line 184 and fed to the cold stripping column 82 at an inlet which may be in a top half of the column. The cold liquid hydrocracked stream that may be a flash cold liquid hydrocracked stream which comprises at least a portion of the hydrocracked stream in the hydrocracked line 44 may be stripped in the cold stripping column 82 to provide a cold stripping overhead stream of $C_{4-}$ hydrocarbons, hydrogen, hydrogen sulfide and other gases in a cold stripping overhead line 88 extending from an overhead of the cold stripping column and a cold stripped stream in a cold stripped line 98 sourced from the separation section 14. A stripping condenser 91 may be in downstream communication with the stripping overhead line 88. A stripping receiver 92 may be in downstream communication with the stripping condenser 91. The cold stripping overhead stream may be condensed in the stripping condenser 91 and separated in the stripping receiver 92. A stripping receiver overhead line 94 from the receiver 92 carries a vaporous stripping overhead stream comprising LPG and light gases. Unstabilized liquid naphtha from the bottoms of the receiver 92 in a stripping receiver bottoms line 93 extending from a bottom of the stripping receiver may be split between a reflux portion refluxed to the top of the cold stripping column 82 and a liquid stripping overhead stream which may be transported in a liquid stripping overhead line 96 to a light fractionation feed inlet 96i to the light fractionation column 160. A sour water stream may be collected from a boot of the overhead receiver 92. The light fractionation column 160 may be in downstream communication with the stripping receiver bottoms line 93 and the liquid stripping overhead line 96.

The cold stripping column 82 may be operated with a bottoms temperature between about 149° C. (300° F.) and about 288° C. (550° F.), preferably no more than about 260° C. (500° F.), and an overhead pressure of about 0.35 MPa (gauge) (50 psig), preferably no less than about 0.70 MPa (gauge) (100 psig), to no more than about 2.0 MPa (gauge) (290 psig). The temperature in the overhead receiver 92 ranges from about 38° C. (100° F.) to about 66° C. (150° F.) and the pressure is essentially the same as or lower in the overhead of the cold stripping column 82.

The cold stripping column 82 may use an inert gaseous media such as steam for stripping media and/or heat input to the column. In an embodiment, a cold reboil stripped stream, taken from a bottom 83 of the cold stripping column 82 in a cold reboil stripped line 97 extending from a bottom 83 of the cold stripping column 82 or from the cold stripped stream taken from a bottom 83 of the cold stripping column 82 in the cold stripped line 98 extending from a bottom 83 of the cold stripping column 82, may be boiled up in a reboiler 95 and returned to the cold stripping column 82 to provide heat to the column 82. The bottom 83 of the cold stripping column 82 is located below the lowest tray in the column. This is in alternative to inputting an inert gaseous media stream such as steam to the cold stripping column 82 which avoids dew point concerns in the overhead and avoids the additional equipment needed for steam transport and water recovery. Hot oil may be used to heat the reboiler 95.

A net cold stripped stream in a net cold stripped line 99 may comprise the predominance of $C_{5+}$ hydrocarbons in the cold liquid hydrocracked stream fed to the cold stripping column 82 in the hydrocracked stream in the hydrocracked line 44. In an embodiment, the net cold stripped stream in net cold stripped line 99 may be split into aliquot portions comprising a fractionation feed cold stripped stream in a fractionation feed cold stripped line 126 and an absorbent stream in an absorbent line 106. The fractionation feed cold stripped stream in a fractionation feed cold stripped line 126 may be cooled by heat exchange in a light heat exchanger 129 with a light reboil stream in a light reboil line 128 and fed to a product fractionation column 140.

The product fractionation column 140 may be in downstream communication with the cold stripped line 98 of the cold stripping column 82 and the stripping column 80. In an embodiment the entirety of the cold stripped stream in the net cold stripped line 99 may be fed to the product fractionation column. In another embodiment, the entirety of an aliquot portion comprising the fractionation feed cold stripped stream in the fractionation feed cold stripped line 126 may be fed to the product fractionation column 140. In an aspect, the product fractionation column 140 may comprise more than one fractionation column. The product fractionation column 140 may be in downstream communication with one, some or all of the hot separator 46, the cold separator 52, the hot flash drum 62 and the cold flash drum 68.

The flash hot liquid hydrocracked stream in the flash hot bottoms line 66 may be taken as a hot liquid hydrocracked stream and stripped in the hot stripping column 86 to provide a hot stripping overhead stream of $C_{5-}$ hydrocarbons, hydrogen, hydrogen sulfide and other gases in a hot stripping overhead line 100 and a hot stripped stream in a hot stripped line 102 sourced from the separation section 14. The overhead line 100 may be condensed and a portion refluxed to the hot stripping column 86. However, in an embodiment of the Figure, the hot stripping stream in the hot stripping overhead line 100 from the overhead of the hot stripping column 86 may be passed into the cold stripping column 82 directly in an aspect without first condensing or refluxing. The hot stripping overhead line 100 may extend from an overhead 85 of the hot stripping column 86 which is above the last tray in the hot stripping column. The cold stripping column may be in downstream communication with the hot stripping overhead line 100. The inlet for the cold flash bottoms line 72 carrying the flash cold liquid hydrocracked stream may be at a higher elevation than the inlet for the overhead line 100 or they may be mixed and fed to the same inlet to the cold stripping column 82. The hot stripping column 86 may be operated with a bottoms temperature between about 160° C. (320° F.) and about 360° C. (680° F.) and an overhead pressure of about 0.35 MPa (gauge) (50 psig), preferably about 0.70 MPa (gauge) (100 psig), to about 2.0 MPa (gauge) (292 psig). The stripping columns are run at higher pressure to optimize the recovery of LPG and LN.

A reboil hot stripped stream taken from a bottom 87 of the hot stripping column 86 in a hot reboil stripped line 103 extending from a bottom 87 of the hot stripping column or the hot stripped stream taken from a bottom 87 of the hot stripping column 86 in the hot stripped line 102 extending from a bottom 87 of the hot stripping column may be boiled up in a reboiler 105 and returned to the hot stripping column 86 to provide heat to the column. The reboiler 105 may be a fired heater that is in downstream communication with a reboil hot stripped line 103 and/or the hot stripped line 102 extending from the bottom 87 of the hot stripping column 86. The bottom 87 of the hot stripping column is located below the lowest tray in the column. This is an alternative to inputting a hot stripping media stream such as steam to the hot stripping column 86 which avoids dew point concerns in the overhead and avoids the additional equipment needed for steam transport and water recovery. A hot oil stream may alternatively be used in a heat exchanger to reboil the reboil stream in the reboil hot stripped line 103. A hot stripped stream in a hot stripped line 102, which may be a net hot stripped stream if the reboil stream in the reboil hot stripped line 103 is taken from the hot stripped stream, may comprise the predominance of $C_{6+}$ naphtha in the hot liquid hydrocracked stream fed to the hot stripping column 86. The hot stripped stream in the hot stripped line 102 may comprise the predominance of the $C_{6+}$ material from the hydrocracked stream in the hydrocracked line 44.

At least a portion of the hot stripped stream in the hot stripped line 102 may be fed to the product fractionation column 140. Consequently, the product fractionation column 140 may be in downstream communication with the hot stripped line 102 of the hot stripping column 86. The hot liquid hydroprocessed stream in the hot stripped line 102 may be at a hotter temperature than the cold stripped stream in the cold stripped line 98.

In a further aspect, the hot stripped stream in hot stripped line 102 is sufficiently hot to be heat exchanged with the cold reboil stream in the cold reboil stripped line 97 and boil it up to reboil temperature in the heat exchanger 95. The hot stripped stream will still be at sufficient temperature to enter the product fractionation column 140 without need of heating. The heat exchanger 95 may be an indirect heat exchanger and have one side in downstream communication with a hot stripped line 102 and/or the reboil hot stripped line 103 extending from the bottom 87 of the hot stripping column 86 and another side in downstream communication with cold stripped line 98 and/or the cold reboil stripped line 97 extending from the bottom 83 of the cold stripping column 82. The hot stripped stream in the hot stripped line 102 after cooling in the heat exchanger 95 may be fed to the product fractionation column 140. Alternatively, the cold stripped stream may be boiled up in the heat exchanger 95 by heat exchange with hot oil or by the hydrocracked stream in hydrocracked line 44.

The product fractionation column 140 may be in downstream communication with the hot stripping column 86 for separating the hot stripped stream into product streams. Even though the hot stripped stream may have been cooled in the heat exchanger 95, it is not further heated in route to the product fractionation column 140. Hence, the hot stripped stream is withdrawn from the hot stripping column 86 at a temperature that is no less than the temperature at which it is fed to the product fractionation column 140. The cold stripped stream is not further heated in route to the product fractionation column 140. The cold stripped stream may be withdrawn from the cold stripping column 82 at a temperature that is also no less than the temperature at which it is fed to the product fractionation column 140.

The product fractionation column 140 may include a prefractionator 142. In an embodiment, the prefractionator 142 is located outside of the product fractionation column 140. The section of the product fractionation column 140 that does not contain the prefractionator 142 is termed a product section 150 of the product fractionation column 140. In an aspect, the fractionation feed cold stripped stream in the fractionation feed cold stripped line 126 may be fed to the prefractionator 142 through a fractionation feed cold stripped inlet 126i. In an embodiment, the entirety of the aliquot portion comprising the fractionation feed cold stripped stream in the fractionation feed cold stripped line 126 may be fed to the prefractionator 142 of the product fractionation column 140. The prefractionator 142 may comprise a column that may be in downstream or direct, downstream communication with the cold bottoms line 98 extending from a bottom 83 of the cold stripping column 82. The prefractionator 142 may prefractionate the fractionation feed cold stripped stream in the fractionation feed cold stripped line 126 to provide a prefractionation overhead stream in a prefractionation overhead line 132 and a prefractionation bottoms stream in a prefractionation bottoms line 134.

The hot stripped stream in the hot stripped line 102 may feed or bypass the prefractionator 142. In an aspect, the hot stripped stream in the hot stripped line 102 may be fed to the prefractionator 142 through a hot stripped inlet 102i. In this embodiment, the entirety of the hot stripped stream in the hot stripped line 102 is fed to the prefractionator 142 of the product fractionation column 140. The prefractionator 142 may comprise a column that may be in downstream or direct, downstream communication with the hot bottoms line 102 extending from the bottom 87 of the hot stripping column 86. In an aspect, the fractionation feed cold stripped stream in a fractionation feed cold stripped line 126 and the hot stripped stream in the hot stripped line 102 may both be fed to the prefractionator 142. The prefractionator 142 may comprise a column that may be in downstream communication with the hot bottoms line 102 extending from the bottom 87 of the hot stripping column 86 and the cold bottoms line 98 extending from a bottom 83 of the cold stripping column 82. The prefractionator 142 may prefractionate the fractionation feed cold stripped stream and the hot stripped stream to provide a prefractionation overhead stream in a prefractionation overhead line 132 and a prefractionation bottoms stream in a prefractionation bottoms line 134. A fractionation feed cold stripped inlet 126i for the fractionation feed cold stripped line 126 for transporting the fractionator feed cold stripped stream may be located at a higher elevation than the hot bottoms inlet 102i for a hot stripped stream transported in the hot bottoms line 102.

The prefractionation overhead line 132 passes the prefractionation overhead stream which is vapor from a top outlet 132o of the prefractionator 142 to a vapor feed upper inlet 132i into a vapor space above a vapor feed tray 133 in the product section 150 of the product fractionation column 140. The prefractionation bottoms line 134 passes the prefractionation bottoms stream which is liquid from a bottom outlet 134o of the prefractionator 142 to a liquid feed inlet 134i onto a liquid feed tray in the product section 150 of the product fractionation column 140. The prefractionator 142 can be a column that is heat integrated with the product fractionation column 140, so no reboiler or condenser is implemented on the prefractionator 142. The prefractionator 142 may be a Petlyuk column.

A liquid reflux stream in a reflux line 136 is taken from a liquid outlet on a lower side of the vapor feed tray 133 in the product section 150 of the product fractionation column 140 and refluxed back to the prefractionator 142. The reflux stream is taken from the liquid outlet on the vapor feed tray 133 that is below the vapor feed upper inlet 132i for the prefractionation overhead stream to the product section 150 of the product fractionation column 140. A reflux inlet 136i for the reflux line 136 is at an elevation that is lower than the top outlet 132o on the prefractionator 142. A vapor stripping stream in a stripping line 138 is taken from a vapor outlet in a vapor space above the liquid feed tray 135 in the product section 150 of the product fractionation column 140 and returned back to the prefractionator 142. The stripping stream is taken from the vapor outlet that is above the liquid feed inlet 134i for the prefractionation bottoms stream to the product section 150 of the product fractionation column 140. A stripping inlet 138i for the stripping line 138 is at an elevation that is higher than the bottom outlet 134o on the prefractionator 140. The product section 150 of the product fractionation column 140 may be in downstream communication with an overhead outlet 132o of the prefractionator 142 and with a bottoms outlet 134o of the prefractionator.

In an embodiment, the hot stripped stream in the hot bottoms line 102 may bypass the prefractionator 142 and enter the product section 150 of the product fractionation column 140 directly. In this aspect, an inlet for the hot bottoms line 102 is located below the liquid feed inlet 134i from the prefractionator 142. In this embodiment, the entirety of the hot stripped stream in the hot stripped line 102 is fed to the product section 150 of the product fractionation column 140. Consequently, the product section 150 of the product fractionation column 140 may be in direct, downstream communication with the hot stripped line 102 of the hot stripping column 86. The prefractionator 142 may be in downstream, indirect communication with the hot stripped line 102 of the hot stripping column 86 if the hot stripped line 102 first feeds the product section 150 of the product fractionation column 140 of which the prefractionator 142 is in downstream communication.

The product fractionation column 140 separates three product streams comprising, light naphtha (LN), heavy naphtha (HN) and distillate. The product fractionation column 140 fractionates fractionation feed cold stripped stream in the fractionation feed cold stripped line 126 and the hot stripped stream in the hot stripped line 102 after prefractionation in the prefractionator 142 of at least the fractionation feed cold stripped stream to provide a product overhead stream comprising LN in a net product overhead line 146, a product intermediate stream comprising heavy naphtha taken from a side outlet 148o in a product intermediate line 148 and a net product bottoms stream comprising an unconverted oil stream in a net product bottoms line 156. The unconverted oil stream may be a distillate such as diesel and/or kerosene if the hydrocarbon stream in the hydrocarbon line 18 is a distillate stream. Alternatively, the unconverted oil stream may be a heavier stream such as vacuum gas oil if the hydrocarbon stream in the hydrocarbon line 18 is a vacuum gas oil stream.

A product overhead stream in a product overhead line 154 from the product section of the product fractionation column 140 may be cooled to complete condensation to provide the net product overhead stream comprising LN in the net product overhead line 146. A reflux portion of the product overhead stream may be refluxed to the product section 150 of the product fractionation column 140. The net product overhead stream in the net product overhead line 146 comprises a predominance of the $C_5$-$C_6$ naphtha in the fractionator feed cold stripped stream in the fractionator feed cold stripped line 126 and the hot stripped stream in the hot stripped line 102. A product bottoms stream in a product bottoms line 152 from a bottom of the product section 150 of the product fractionation column 140 may be split between the net product bottoms stream in the net product bottoms line 156 and a product boilup stream in a product reboil line 158. The product boilup stream in the product reboil line 158 is reboiled in a heater requiring external utilities such as a fired heater or hot oil and returned to the product section of the product fractionation column 140. The intermediate stream taken from the side outlet 148o is taken from the side of the product section 150 of the product fractionation column 140. The intermediate stream is withdrawn from the side outlet 148o between an vapor feed upper inlet 132i of the prefractionated overhead stream to the product section 150 of the product fractionation column 140 and a lower liquid inlet 134i of the prefractionated bottoms stream to the product section of the product fractionation column. A recycle oil stream comprising distillate or VGO unconverted oil may be taken from the product fractionator bottoms line 152 and provided in recycle oil line 156 to the hydrocracking reactor 40 or to a second hydrocracking reactor that is not shown for a second stage unit. The product fractionation column 140 may be operated at a temperature between about 204° C. (400° F.) and about 385° C. (725° F.) and a pressure between about 69 and about 414 kPa (abs). The product fractionation column 140 may be operated to minimize energy consumption because a good split is effected in the stripping column 80 and because the stripping column 80 and the product fractionation column 140 are thermally integrated to minimize remixing of light and heavy components.

The net product bottoms stream in the net product bottoms line 156 comprises the predominance of the distillate including diesel and/or kerosene or VGO from the hydrocracked stream in the hydrocracked line 44. The naphtha cut point between naphtha and distillate may be between about 150° C. (302° F.) and about 200° C. (392° F.). The net product overhead stream in the net product overhead line 146 comprises more LN than in the product intermediate stream in the product intermediate line 148 or in the net product bottom stream in the net product bottoms line 156. The cut point between LN and HN may be between 77° C.

(170° F.) and 99° C. (210° F.). The product intermediate stream in the product intermediate line 148 comprises more HN than in the net product overhead stream in the net product overhead line 146 or in the net product bottom stream in the net product bottoms line 152. The intermediate stream in the intermediate line 148 taken from the side outlet 148*o* comprises the predominance of the $C_6$-$C_{12}$ material from the hydrocracked stream in the hydrocracked line 44.

If the net product bottoms stream in the net product bottoms line 156 comprises distillate including kerosene and/or diesel it can have a T5 between about 165° C. (330° F.) and about 204° C. (400° F.) and a T95 between about 266° C. (510° F.) and about 371° C. (700° F.) using the ASTM D-86 distillation method. If the net product bottoms stream in the net product bottoms line 156 comprises VGO, it can have a T5 between about 165° C. (330° F.) and about 204° C. (400° F.) and a T95 between about 480° C. (900° F.) and about 565° C. (1050° F.) using the ASTM D-86 distillation method. The product intermediate stream comprising HN in the product intermediate line 148 can have a T5 between about 65° C. (150° F.) and about 120° C. (248° F.) and a T95 between about 154° C. (310° F.) and about 193° C. (380° F.) using the ASTM D-86 distillation method. The net product overhead stream in the net product overhead line 146 comprising LN can have a T5 between about 7° C. (45° F.) and 40° C. (100° F.) and a T95 between about 50° C. (120° C.) and 82° C. (180° F.).

Figure 2:
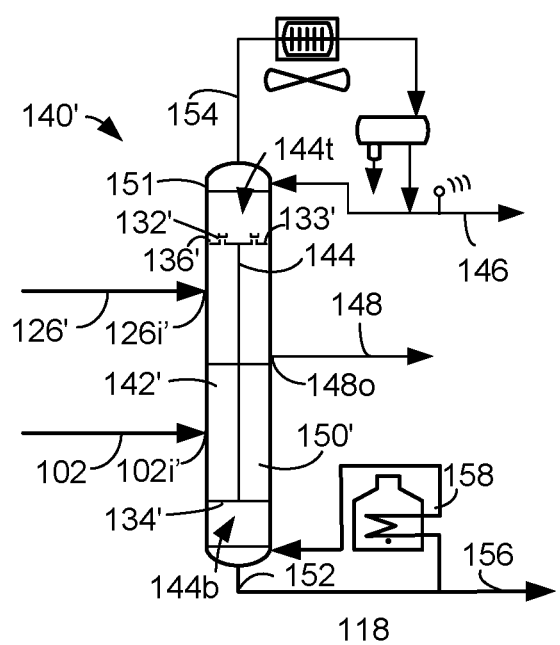
FIG. 2 is an alternative embodiment to FIG. 1.

FIG. 2 illustrates an alternative embodiment to the product fractionation column 140' of FIG. 1. Many of the elements in FIG. 2 have the same configuration as in FIG. 1 and bear the same reference number. Elements in FIG. 2 that correspond to elements in FIG. 1 but have a different configuration bear the same reference numeral as in FIG. 1 but are marked with a prime symbol ('). In the embodiment of FIG. 2, the prefractionator 142' is contained in the product fractionation column 140'. The product fractionation column 140' may comprise a dividing wall 144 which divides the product fractionation column 140' into a prefractionator 142' and a product section 150'. A top end 144*t* and a bottom end 144*b* of the dividing wall 144 do not touch a top and a bottom of the product fractionation column 140', respectively, so material can travel over and below the dividing wall 144 from a prefractionator 142' to the product section 150' and vice versa. The top end 144*t* of the dividing wall 144 defines an upper inlet 132' of the prefractionator 142' to the product fractionation column 140' and the bottom end 144*b* of the dividing wall defines a lower inlet 134' of the prefractionator to the product fractionation column 140'.

The fractionation feed cold stripped stream in a fractionation feed cold stripped line 126' may be fed to the prefractionator 142' through a wall 151' of the product fractionation column 140'. The prefractionator 142' may be in downstream communication with the cold bottoms line 98. A fractionation feed cold inlet 126*i'* of the cold stripped stream in the fractionation feed cold stripped line 126 is located vertically between the top end 144*t* and the bottom end 144*b* of the dividing wall 144. The dividing wall 144 is interposed between prefractionator 142' and the side outlet 148*o*, so feed materials have to travel above or below the dividing wall 144 to exit the side outlet 148*o* in the product intermediate stream in the product intermediate line 148. The prefractionator 142' prefractionates the fractionation feed cold stripped stream to provide a prefractionation overhead stream that exits the prefractionator 142' by ascending over the top end 144*t* of the dividing wall 144 and a prefractionation bottoms stream that exits the prefractionator 142' by descending under the bottom end 144*b* of the dividing wall 144.

The hot stripped stream in the hot stripped line 102' may be fed to the prefractionator 142' through a wall 151' of the product fractionation column 140'. The prefractionator 142' may be in downstream communication with the hot bottoms line 102'. In this aspect, fractionation feed cold inlet 126*i'* of the cold stripped stream in the fractionation feed cold stripped line 126' and the hot stripped feed inlet 102*i'* of the hot stripped stream in the hot stripped line 102' are located vertically between the top end 144*t* and the bottom end 144*b* of the dividing wall 144. The dividing wall 144 is interposed between prefractionator 142' and the side outlet 148*o*, so feed materials have to travel above or below the dividing wall 144 to exit the side outlet 148*o* in the product intermediate stream in the product intermediate line 148. The prefractionator 142' prefractionates the hot stripped stream to provide a prefractionation overhead stream that exits the prefractionator 142' by ascending over the top end 144*t* of the dividing wall 144 and a prefractionation bottoms stream that exits the prefractionator 142' by descending under the bottom end 144*b* of the dividing wall 144.

In another aspect, the hot stripped stream in the hot stripped line 102 may be fed to the product fractionation column 140' so as to bypass the prefractionator 142' by locating the hot stripped feed inlet 102*i'* below the bottom end 144*b* of the dividing wall 144.

The prefractionation overhead stream which is vapor ascends from the prefractionator 142' to above the top end 144*t* of the dividing wall 144 through the upper inlet 132' to the product fractionation column 140'. The upper inlet 132' may be defined by a chimney in an upper tray 133' above the dividing wall 144. The prefractionation bottoms stream which is liquid descends from the prefractionator 142' to below the bottom end 144*b* of the dividing wall 144 in the product fractionation column 140' through an bottom inlet 134' to the product fractionation column 140'. The prefractionator 142' is heat integrated with the product fractionation column 140', so no additional reboiler or condenser is implemented on the prefractionator 142'. The product fractionation column 140' may be a dividing wall column.

A liquid reflux stream from above the top end 144*t* of the dividing wall 144 in the product fractionation column 140' may be refluxed back to the prefractionator 142' as well as to the product section 150' below the top end 144*t*. A reflux outlet 136' from the product fractionation column 140' to the prefractionator 142' may be a downcomer in the upper tray 133' or a liquid collection well that distributes liquid below the upper tray at an elevation that is lower than the upper inlet 132' to the prefractionator 142'. A vapor stripping stream from below the bottom end 144*b* of the dividing wall 144 in the product fractionation column 140' may be returned back to the prefractionator 142' as well as to the product section 150' below the bottom end 144*b*. A stripping outlet from the product fractionation column 140' back to the prefractionator 142' may be the same as the bottom inlet 134'. The product fractionation column 140' may be in downstream communication with the upper inlet 132' from the prefractionator 140' and with the lower inlet 134' from the prefractionator.

The product fractionation column 140' separates three product streams comprising, light naphtha (LN), heavy naphtha (HN) and distillate. The product fractionation column 140' fractionates the fractionation feed cold stripped stream in the fractionation feed cold stripped line 126' after prefractionation in the prefractionator 142'and the hot stripped stream in the hot stripped line 102' perhaps after prefractionation in the prefractionator 142' to provide a product overhead stream comprising LN in a net product overhead line 146, a product intermediate stream comprising heavy naphtha taken from a side outlet 148o in a product intermediate line 148 and a net product bottoms stream comprising distillate, such as diesel and/or kerosene, and/or VGO in a net product bottoms line 156. A product overhead stream in a product overhead line 154 from the product fractionation column 140' may be cooled to complete condensation to provide the net product overhead stream comprising LN in the net product overhead line 146. A reflux portion of the product overhead stream may be refluxed to the product fractionation column 140'. A product bottoms stream in a product bottoms line 152 from a bottom of the product fractionation column 140' may be split between the net product bottoms stream in the net product bottoms line 156 and a product boilup stream in a product reboil line 158. The product boilup stream in the product reboil line 158 is reboiled in a heater requiring external utilities such as a fired heater and returned to the product fractionation column 140'. The intermediate stream taken from the side outlet 148o is taken from the side of the product fractionation column 140'. The intermediate stream is withdrawn from the side outlet 148o between an upper inlet 132' of the prefractionated overhead stream to the product fractionation column 140' and a lower inlet 134' of the prefractionated bottoms stream to the product fractionation column. The product fractionation column 140' may be operated at a temperature between about 204° C. (400° F.) and about 385° C. (725° F.) and a pressure between about 103 and about 276 kPa (gauge). The rest of the embodiment of FIG. 2 is configured and operates as described for FIG. 1.

The liquid stripping overhead stream in the liquid stripping overhead line 96 contains valuable hydrocarbons that can still be recovered. Hence, it may be transported to a light fractionation column 160 to be fractionated to recover light hydrocarbons in the LPG and LN range. The light fractionation column 160 may be in downstream communication with the cold stripping overhead line 88 of the cold stripping column 82.

The liquid stripping stream in the liquid stripping overhead line 96 can be heated for light fractionation by heat exchange in the recovery section 16. A light intermediate heat exchanger 125 with one side in downstream communication with the light fractionation intermediate line 166 and another side in downstream communication with the liquid stripping overhead line 96 transfers heat from the light fractionation intermediate stream to the liquid stripping overhead stream. A product intermediate heat exchanger 145 with one side in downstream communication with the product fractionation intermediate line 148 and another side in downstream communication with the liquid stripping overhead line 96 in downstream communication with the light intermediate heat exchanger 125 transfers heat from the product fractionation intermediate stream to the once heated liquid stripping overhead stream. A light bottoms heat exchanger 165 with one side in downstream communication with a net light fractionation bottoms line 172 and another side in downstream communication with the liquid stripping overhead line 96 in downstream communication with the product intermediate heat exchanger 145 transfers heat from the net light fractionation bottoms stream to the twice heated liquid stripping overhead stream. The liquid stripping overhead stream in the liquid stripping overhead line 96 is heated just by heat exchange with hotter streams in the recovery section 16 to be sufficiently heated for fractionation in the light fractionation column 160.

The light fractionation column 160 fractionates the liquid stripping overhead stream in the liquid stripping overhead line 96 fed through a light fraction feed inlet 96i to provide a light fractionated overhead stream, which is vaporous, in a light overhead line 162 extending from an overhead of the light fractionation column, a light fractionated intermediate stream in a light fractionated intermediate line 166 extending from a side 161 of the light fractionation column and a light fractionated bottoms stream in a light fractionated bottoms line 164 extending from a bottom of the light fractionation column. The light fractionation of the liquid stripping overhead stream in the liquid stripping overhead line 96 into the three forenamed streams is achieved in a single light fractionation column 160.

A light condenser 163 may be in downstream communication with the light overhead line 162 to at least partially condense the light fractionated overhead stream therein. A light overhead receiver 168 may be in downstream communication with the light condenser 163 and the light overhead line 162. A light fractionated overhead stream in a light fractionator overhead line 162 may be at least partially condensed and separated in the light overhead receiver 168 into a liquid light fractionated overhead stream for reflux to the column 160 and a vaporous light fractionated overhead stream predominantly comprising dry gas, which are $C_{2-}$ and lighter including non-organic gases, in a light receiver overhead line 170.

In an embodiment, the light fractionation column 160 may be a debutanizer column to fractionate the liquid stripping stream in the liquid cold stripping overhead line 96 into a light bottoms stream comprising predominantly $C_{5+}$ hydrocarbons. A light fractionated bottoms stream may be withdrawn from a bottom of the light fractionation column 160 in a light bottoms line 164. A reboil stream taken from the light bottoms stream or from a bottom of the light fractionation column 160 in the light bottoms line 164 may be boiled up in the light reboil line 128 and sent back to the light fractionation column to provide heat to the column. This is in alternative to inputting a hot inert media stream such as steam to the column 160 which avoids dew point concerns in the overhead and avoids the additional equipment needed for steam transport and water recovery. The light reboil stream in the light reboil line 128 may be heated by heat exchange in the light heat exchanger 129 with the fractionation feed cold stripped stream in the fractionation feed cold stripped line 126 which is hotter than the light reboil stream in the light reboil line 128 and fed back to the light fractionation column 160.

A net light bottoms stream, in an embodiment comprising $C_5$-$C_6$ hydrocarbons boiling in the light naphtha range is withdrawn in a net light bottoms line 172. The cut point between LPG and LN may be between 4° C. (40° F.) and 38° C. (100° F.). The net light bottoms stream in the net light bottoms line 172 comprising LN can have a T5 between about 7° C. (45° F.) and 40° C. (104° F.) and a T95 between about 50° C. (120° C.) and 82° C. (180° F.). The net light bottoms stream in the net light fractionated bottoms line 172 contains the predominance of the $C_5$-$C_6$ hydrocarbons, also known as LN, from the hydrocracked stream in the hydrocracked line 44 and in the fractionation feed cold stripped stream in the fractionation feed cold stripped line 126 without need of an additional naphtha splitter column. The net light bottoms stream in the net light bottoms line 172 may be heat exchanged in the light bottoms heat exchanger 165 to heat the liquid stripping stream in the liquid cold stripping line 96 before it enters the light fractionation column 160. The cooled net light bottoms stream in the net light bottoms line 172 may be mixed with the net product overhead stream comprising LN in the net product overhead line 146 to provide a LN product stream in the LN product line 174. A predominance of the LN in the hydrocracked product stream in the hydrocracked product line 44 is taken in the LN product stream in the LN product line 174. The net LN product stream in the net LN product line 174 can have a T5 between about 7° C. (45° F.) and 40° C. (104° F.) and a T95 between about 50° C. (120° C.) and 82° C. (180° F.).

A light fractionated intermediate stream may be taken from an intermediate side outlet 166o in the side 161 of said light fractionation column 160 in a light fractionation intermediate line 166. The light fractionation feed inlet 96i to the light fractionation column 160 in downstream communication with the liquid stripping overhead line 96 is located at an elevation that is lower than the intermediate side outlet 166o for the light fractionation intermediate line 166. A predominance of the LPG from the hydrocracked stream in the hydrocracked line 44 is in the light fractionated intermediate stream in the light fractionation intermediate line 166. The light fractionated intermediate stream in the light fractionation intermediate line 166 is heat exchanged with the liquid cold stripping stream in the liquid stripping overhead line 96 and provides an LPG product stream. The LPG product stream comprising LPG in the light fractionation intermediate line 166 can comprise between about 10 and about 30 mol % propane and between about 60 and about 90 mol % butane.

The light fractionation column 160 may be operated with a bottoms temperature between about 105° C. (225° F.) and about 200° C. (392° F.), preferably between about 160° C. (320° F.) and about 200° C. (392° F.) and an overhead pressure of about 689 kPa (gauge) (100 psig) to about 2.4 MPa (gauge) (350 psig), preferably about 1 MPa (gauge) (150 psig) to about 2 MPa (gauge) (300 psig). By using a single three-product debutanizer light fractionation column 160, a deethanizer column, including a concomitant reboiler and condenser are omitted, resulting in less condenser duty.

The vaporous stripping stream in the stripping receiver overhead line 94 from the stripping receiver 92 may contain LPG hydrocarbons that can be recovered. The vaporous stripping overhead stream comprising LPG hydrocarbons and dry gas may be transported to sponge absorber column 180 to recover LPG and naphtha hydrocarbons. In an aspect, the entire vaporous stripping overhead stream in the stripping receiver overhead line 94 is transported to the sponge absorber column 180 to have LPG absorbed from the entirety of the vaporous stripping overhead stream.

The vaporous light fractionated overhead stream in the light receiver overhead line 170 from the light receiver 168 may contain LPG hydrocarbons that can be recovered. The vaporous light fractionated overhead stream comprising LPG hydrocarbons and dry gas may be transported to sponge absorber column 180 to recover LPG and naphtha hydrocarbons. In an aspect, the entire vaporous light fractionated overhead stream in the light receiver overhead line 170 is transported to the sponge absorber column 180 to have LPG absorbed from the entirety of the vaporous stripping overhead stream.

A lean absorbent stream is taken from the net cold stripped stream in the net cold stripped line 99 in a lean absorbent line 106. In an aspect, the lean absorbent stream in the lean absorbent line 106 is an aliquot portion of the net cold stripped stream in the net cold stripped line 99. The fractionation feed cold stripped stream in the fractionation feed cold stripped line 126 may also be taken from the net cold stripped stream in the net cold stripped line 99, in an aspect, as an aliquot portion. The lean absorbent stream in the lean absorbent line 106 is cooled by heat exchange with a rich absorbent stream in the absorber bottoms line 184 and further cooled before it is fed to the sponge absorber column 180. No equipment such as a coalescer is needed to remove water from the lean absorbent stream in absorbent line 106 because the cold stripping column 82 uses a reboiler 95 instead of steam stripping to heat the column. Hence, no aqueous phase is present in the lean absorbent stream due to the lack of steam added during stripping with a reboil column. The sponge absorber column 180 is in direct, downstream communication with the cold stripping column 82 and specifically a cold stripped line 98.

The multi-tray sponge absorber column 180 may include a gas inlet at a tray location near a bottom of the sponge absorber column 180. The sponge absorber 180 receives the vaporous stripping stream in the stripping receiver overhead line 94 at the gas inlet via a sponge absorber feed line 178. The sponge absorber column 180 may be in direct, downstream communication with the cold stripping column 82, specifically the stripping receiver overhead line 94.

The sponge absorber 180 may also receive the vaporous light fractionated overhead stream in the light receiver overhead line 170 at the gas inlet via the sponge absorber feed line 178. The sponge absorber column 180 may be in direct, downstream communication with the light fractionation column 160 specifically the net light receiver overhead line 170. In an aspect, the sponge absorber feed line 178 may feed the vaporous light fractionated overhead stream from the light receiver overhead line 170 and the vaporous stripping overhead stream from the stripping receiver overhead line 94 together to the sponge absorber column 180.

The lean absorbent stream in the lean absorbent line 106 may be fed into the sponge absorber column 180 through an absorbent inlet. In the sponge absorber 180, the lean absorbent stream and the vaporous stripping stream are countercurrently contacted. The sponge absorbent absorbs hydrocarbons from the vaporous stripping stream. In the sponge absorber 180, the lean absorbent stream and the vaporous light fractionated overhead stream are counter currently contacted. The sponge absorbent absorbs hydrocarbons from the vaporous light fractionated overhead stream. The sponge absorbent may absorb hydrocarbons from the vaporous light fractionated overhead stream and the vaporous stripping overhead stream together.

The hydrocarbons absorbed by the sponge absorbent include some methane and ethane and most of the LPG, $C_3$ and $C_4$, hydrocarbons, and any $C_5$, and $C_{6+}$ light naphtha hydrocarbons in the cold stripped overhead stream and/or the light fractionated overhead stream. The sponge absorber column 180 operates at a temperature of about 34° C. (93° F.) to 60° C. (140° F.) and a pressure essentially the same as or lower than the stripping receiver 92 and/or the light receiver 168 less frictional losses. A sponge absorption off gas stream is withdrawn from a top of the sponge absorber column 180 at an overhead outlet through a sponge absorber overhead line 182. A portion of the sponge absorption off gas stream in the sponge absorber overhead line 182 may be transported to a hydrogen recovery unit that is not shown for hydrogen recovery. A rich absorbent stream rich in LPG hydrocarbons is withdrawn in a rich absorber bottoms line 184 from a bottom of the sponge absorber column 180 at a bottoms outlet and may be recycled to the stripping column 80 and specifically the cold stripping column 82. The rich absorbent stream in the absorber bottoms line 184 may be heat exchanged with the lean absorbent stream in the lean absorbent line 106 to cool the lean absorbent stream and heat the rich absorbent stream. The cold stripping column 82 may be in downstream communication with the sponge absorber 180 through the absorber bottoms line 184. It is contemplated to reboil all the columns with a hot oil system except the sponge absorber column 180 which is run cold to maximize recovery of LPG.

Any of the above lines, units, separators, columns, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring components, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

EXAMPLES

Example 1

A mixture of straight run gas oil and coker gas oil having a TBP T5 of 176° C. and a T90 of 357° C. was simulated in a two-stage hydrocracking unit with fractionated diesel range material being cycled to the second stage hydrocracking reactor. Use of a cold stripping column and a hot stripping column with heat integration between the column reboilers as described resulted in the elimination of 5397 kg/hr (5.95 tons/hour) of steam usage and 29.5 kJ/hr (28 Mbtu/hr) savings in heater duty over a single stripping column. Additionally, less material is lifted to the stripping overhead requiring less condenser duty in the overhead and less load on a downstream light fractionation column to remove heavier material that is designed for exit in the stripped bottoms stream. The stripped streams from the stripped bottoms are at higher temperature requiring less heater duty in the product fractionation column.

Example 2

The simulation of Example 1 was further evaluated comparing use of a conventional product fractionation to product fractionation using a prefractionator Petlyuk column. We found that the product fractionation column with the prefractionator used 16,964 kg/hr (18.7 tons/hr) less steam and 2.5 kJ/hr (2.4 MBtu/hr) less duty. The prefractionator also enabled a higher bottoms temperature which leads to capital savings in the reactor section and lower condenser duty, less sour water and more trays of lesser diameter. Moreover, by taking an intermediate cut of heavy naphtha and taking an overhead cut of light naphtha, a naphtha splitter column may be omitted.

Example 3

The simulation of Examples 1 and 2 was further evaluated comparing use of a conventional deethanizer/debutanizer column combination to a single light fractionation column which provided three product cuts. We found that the light fractionation column which provide an intermediate light cut of LPG used 1.7 kJ/hr (1.6 MBtu/hr) less duty than the conventional deethanizer/debutanizer column combination. The light fractionation column used one column, one reboiler and one condenser instead of two; more trays but lesser condenser duty.

SPECIFIC EMBODIMENTS

While the following is described in conjunction with specific embodiments, it will be understood that this description is intended to illustrate and not limit the scope of the preceding description and the appended claims.

A first embodiment of the invention is a process for recovering hydrocracked product comprising hydrocracking a feed stream in a hydrocracking reactor with a hydrogen stream over hydrocracking catalyst to provide a hydrocracked stream; separating the hydrocracked stream into a hot liquid hydrocracked stream and a cold liquid hydrocracked stream; stripping the hot liquid hydrocracked stream in a hot stripping column to provide a hot stripped stream; boiling up a hot reboil stream taken from a bottom of the hot stripping column and returning it to the hot stripping column; and stripping the cold liquid hydrocracked stream in a cold stripping column to provide a cold stripped stream. An embodiment of the invention is one, any or all of prior embodiments in this paragraph up through the first embodiment in this paragraph further comprising boiling up a cold reboil stream taken from the cold stripped stream and returning it to the cold stripping column. An embodiment of the invention is one, any or all of prior embodiments in this paragraph up through the first embodiment in this paragraph further comprising taking a hot stripped stream from a bottom of the hot stripping column and heating the cold reboil stream by heat exchange with the hot stripped stream. An embodiment of the invention is one, any or all of prior embodiments in this paragraph up through the first embodiment in this paragraph further comprising boiling up the hot reboil stream in a fired heater. An embodiment of the invention is one, any or all of prior embodiments in this paragraph up through the first embodiment in this paragraph further comprising separating the hydrocracked stream in a hot separator to provide a hot vaporous stream and a hot liquid stream and taking the hot liquid hydrocracked stream from the hot liquid stream; and separating the hot vaporous hydrocracked stream in a cold separator to provide a cold vaporous stream and a cold liquid stream and taking the cold liquid hydrocracked stream from the cold liquid stream. An embodiment of the invention is one, any or all of prior embodiments in this paragraph up through the first embodiment in this paragraph further comprising separating the cold liquid stream to provide a flash cold liquid stream and a flash cold vapor stream and taking the cold liquid hydrocracked stream from the flash cold liquid stream. An embodiment of the invention is one, any or all of prior embodiments in this paragraph up through the first embodiment in this paragraph further comprising separating the hot liquid stream to provide a flash hot liquid stream and a flash hot vapor stream and taking the hot liquid hydrocracked stream from the flash hot liquid stream. An embodiment of the invention is one, any or all of prior embodiments in this paragraph up through the first embodiment in this paragraph further comprising separating the hot vapor stream to provide a flash cold liquid stream and a flash cold vapor stream and taking the cold liquid hydrocracked stream from the flash cold liquid stream. An embodiment of the invention is one, any or all of prior embodiments in this paragraph up through the first embodiment in this paragraph further comprising passing a hot overhead stripping stream to the cold stripping column. An embodiment of the invention is one, any or all of prior embodiments in this paragraph up through the first embodiment in this paragraph wherein the hot stripped stream comprises the predominance of the $C_{6+}$ material from the hydrocracked stream. An embodiment of the invention is one, any or all of prior embodiments in this paragraph up through the first embodiment in this paragraph, further comprising at least one of sensing at least one parameter of the process and generating a signal or data from the sensing; and generating and transmitting a signal or data.

A second embodiment of the invention is an apparatus for recovering hydrocracked product comprising a hydrocracking reactor; a separator in communication with the hydrocracking reactor; a hot stripping column in communication with a bottoms line extending from a bottom of the separator; a cold stripping column in communication with an overhead line extending from an overhead of the separator; and a hot bottoms line extending from a bottom of the hot stripping column and a cold bottoms line extending from a bottom of the cold stripping column; a heat exchanger having one side in communication with the hot bottoms line and another side in communication with the cold bottoms line. An embodiment of the invention is one, any or all of prior embodiments in this paragraph up through the second embodiment in this paragraph further comprising a fired heater in downstream communication with a bottom of the hot stripping column. An embodiment of the invention is one, any or all of prior embodiments in this paragraph up through the second embodiment in this paragraph further comprising a hot stripping overhead line extending from an overhead of the hot stripping column and the cold stripping column in communication with the hot stripping overhead line.

A third embodiment of the invention is a process for recovering hydrocracked product comprising hydrocracking a feed stream in a hydrocracking reactor with a hydrogen stream over hydrocracking catalyst to provide a hydrocracked stream; separating the hydrocracked stream into a hot liquid hydrocracked stream and a cold liquid hydrocracked stream; stripping the hot liquid hydrocracked stream in a hot stripping column to provide a hot stripped stream; boiling up a hot reboil stream taken from the hot stripped stream and returning it to the hot stripping column; stripping the cold liquid hydrocracked stream in a cold stripping column to provide a cold stripped stream; boiling up a cold reboil stream taken from the cold stripped stream and returning it to the cold stripping column; and taking a hot stripped stream from a bottom of the hot stripping column and heating the cold reboil stream by heat exchange with the hot stripped stream. An embodiment of the invention is one, any or all of prior embodiments in this paragraph up through the third embodiment in this paragraph further comprising boiling up the hot reboil stream in a fired heater. An embodiment of the invention is one, any or all of prior embodiments in this paragraph up through the third embodiment in this paragraph further comprising separating the hydrocracked stream in a hot separator to provide a hot vaporous stream and a hot liquid stream and taking the hot liquid hydrocracked stream from the hot liquid stream; and separating the hot vaporous hydrocracked stream in a cold separator to provide a cold vaporous stream and a cold liquid stream and taking the cold liquid hydrocracked stream from the cold liquid stream. An embodiment of the invention is one, any or all of prior embodiments in this paragraph up through the third embodiment in this paragraph further comprising separating the cold liquid stream to provide a flash cold liquid stream and a flash cold vapor stream and taking the cold liquid hydrocracked stream from the flash cold liquid stream. An embodiment of the invention is one, any or all of prior embodiments in this paragraph up through the third embodiment in this paragraph further comprising separating the hot liquid stream to provide a flash hot liquid stream and a flash hot vapor stream and taking the hot liquid hydrocracked stream from the flash hot liquid stream. An embodiment of the invention is one, any or all of prior embodiments in this paragraph up through the third embodiment in this paragraph further comprising passing a hot overhead stripping stream to the cold stripping column. An embodiment of the invention is one, any or all of prior embodiments in this paragraph up through the third embodiment in this paragraph wherein the cold stripped stream and/or the hot stripped stream comprise the predominance of the $C_{6+}$ material from the hydrocracked stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for recovering hydrocracked product comprising:
    hydrocracking a feed stream in a hydrocracking reactor with a hydrogen stream over hydrocracking catalyst to provide a hydrocracked stream;
    separating said hydrocracked stream into a hot liquid hydrocracked stream and a cold liquid hydrocracked stream;
    stripping said hot liquid hydrocracked stream in a hot stripping column to provide a hot stripped stream;
    boiling up a hot reboil stream taken from a bottom of the hot stripping column and returning it to the hot stripping column; and
    stripping said cold liquid hydrocracked stream in a cold stripping column to provide a cold stripped stream.

2. The process of claim 1 further comprising boiling up a cold reboil stream taken from said cold stripped stream and returning it to the cold stripping column.

3. The process of claim 2 further comprising taking a hot stripped stream from a bottom of said hot stripping column and heating said cold reboil stream by heat exchange with said hot stripped stream.

4. The process of claim 1 further comprising boiling up said hot reboil stream in a fired heater.

5. The process of claim 1 further comprising separating said hydrocracked stream in a hot separator to provide a hot vaporous stream and a hot liquid stream and taking said hot liquid hydrocracked stream from said hot liquid stream; and separating said hot vaporous hydrocracked stream in a cold separator to provide a cold vaporous stream and a cold liquid stream and taking said cold liquid hydrocracked stream from said cold liquid stream.

6. The process of claim 5 further comprising separating said cold liquid stream to provide a flash cold liquid stream and a flash cold vapor stream and taking said cold liquid hydrocracked stream from said flash cold liquid stream.

7. The process of claim 5 further comprising separating said hot liquid stream to provide a flash hot liquid stream and a flash hot vapor stream and taking said hot liquid hydrocracked stream from said flash hot liquid stream.

8. The process of claim 7 further comprising separating said hot vapor stream to provide a flash cold liquid stream and a flash cold vapor stream and taking said cold liquid hydrocracked stream from said flash cold liquid stream.

9. The process of claim 1 further comprising passing a hot overhead stripping stream to said cold stripping column.

10. The process of claim 1 wherein said hot stripped stream comprises the predominance of the $C_{6+}$ material from the hydrocracked stream.

11. The process of claim 1, further comprising at least one of:
sensing at least one parameter of the process and generating a signal or data from the sensing; and
generating and transmitting a signal or data.

12. A process for recovering hydrocracked product comprising:
hydrocracking a feed stream in a hydrocracking reactor with a hydrogen stream over hydrocracking catalyst to provide a hydrocracked stream;
separating said hydrocracked stream into a hot liquid hydrocracked stream and a cold liquid hydrocracked stream;
stripping said hot liquid hydrocracked stream in a hot stripping column to provide a hot stripped stream;
boiling up a hot reboil stream taken from said hot stripped stream and returning it to the hot stripping column;
stripping said cold liquid hydrocracked stream in a cold stripping column to provide a cold stripped stream;
boiling up a cold reboil stream taken from said cold stripped stream and returning it to the cold stripping column; and
taking a hot stripped stream from a bottom of said hot stripping column and heating said cold reboil stream by heat exchange with said hot stripped stream.

13. The process of claim 12 further comprising boiling up said hot reboil stream in a fired heater.

14. The process of claim 12 further comprising separating said hydrocracked stream in a hot separator to provide a hot vaporous stream and a hot liquid stream and taking said hot liquid hydrocracked stream from said hot liquid stream; and separating said hot vaporous hydrocracked stream in a cold separator to provide a cold vaporous stream and a cold liquid stream and taking said cold liquid hydrocracked stream from said cold liquid stream.

15. The process of claim 14 further comprising separating said cold liquid stream to provide a flash cold liquid stream and a flash cold vapor stream and taking said cold liquid hydrocracked stream from said flash cold liquid stream.

16. The process of claim 14 further comprising separating said hot liquid stream to provide a flash hot liquid stream and a flash hot vapor stream and taking said hot liquid hydrocracked stream from said flash hot liquid stream.

17. The process of claim 12 further comprising passing a hot overhead stripping stream to said cold stripping column.

* * * * *